radial line cutting the tooth, the greater the lead of the tooth. In the recleaning saw cylinder 7, the front edge of each saw tooth practically coincides with a radius of the saw cylinder, and its lead is very slight; while in the case of the teeth of the gin saws, the inclination of the front edge of the teeth to radial lines from the center of the gin saw cylinder cutting the teeth, is the maximum possible, and the lead of said teeth is very great.

This arrangement is clearly illustrated in Figure 3, where a lock of cotton C is shown in the position it occupies when about to be doffed from the recleaning saw cylinder.

The bottom of the huller breast 3 is formed by an adjustable inclined hull board, 9, the lower end of which defines the size of an opening, 10, past the recleaning saw cylinder 7 for the escape of hulls, trash and other refuse. According to the character of the cotton being ginned the hull board 9 will be adjusted to make the gap 10 as wide as possible without permitting the escape of any cotton of value past the recleaning saw cylinder.

In operation the cotton delivered to the huller breast 3 of my improved gin first directed to the front portion of the recleaning saw cylinder 7, or that portion remote from the gin saws 8, and any loose hull particles and other trash will slide through the gap 10. As the recleaning saw cylinder is run in the same direction as the gin saw cylinder, the cotton falling on the recleaning saws is carried over and delivered to the gin saws. Occasional small one-seed locks of cotton, together with small hull particles and other trash, escape through the spaces between the gin saws with the seed and are carried around by the lower portion of the recleaning saw cylinder, where the brush 6, or an equivalent yielding member causes the locks of cotton to be firmly engaged by the saw teeth and carried up into the working zone of the huller breast, whereas the hull particles and trash, with the seed, are carried over the brush and thrown, by centrifugal action, through the discharge opening 11 with the hull particles and trash discharged through the gap between the hull board and saw cylinder 7.

Any loose hull particles delivered with the cotton to the huller breast 3 readily slide through the gap 10, but the hull particles entangled with the cotton will be carried over to the gin saws and mostly separated by the huller portion 12 of the ribs, whence they are thrown back over to the separating gap 10. The cotton carried through the gin ribs 4 by the gin saws are doffed from the latter by a doffing cylinder, 13. This doffing cylinder is of special construction and forms the subject matter of a separate application for patent.

It will be obvious that while the recleaning saw cylinder 7 requires no more room than the conventional spiked picker roller heretofore employed, the separation it makes of hull particles and other trash entirely independent of, or at a point removed from the gin saws, avoids excessive contact of extraneous matter with these relatively high-speed saws and thus improves the quality of work done by the gin by reducing the quantity of extraneous matter reaching the ginning roll.

My improved recleaning saw cylinder, considered as a substitute for the conventional spiked picker roller, is not only much more effective in reducing the quantity of extraneous matter finding its way into the ginning roll but it also prevents the waste of one-seed lock cotton, which cannot be avoided by the use of the picker roller. It also has the further advantage that the hull board 9, defining the size of the separating gap 10 past the recleaning saw cylinder, is easily and quickly adjustable to meet any requirement; whereas, with the conventional picker roller, the entire roller, including its bearings and driving pulley must be moved to and from the gin saws to adjust it for any change in the character of cotton being handled.

It will be apparent, of course, that I entirely omit the use of the doffing cylinder incident to the arrangement of the machines illustrated in my two prior patents first referred to. Thus the recleaning saw cylinder with its accessories functions as an extractor for removing hulls and trash independently of the gin saws, as a picker roller for delivering cotton to the gin saws, and as a reclaiming saw for recovering small-lock cotton from the seed and small trash escaping between the gin saws.

While I have illustrated my improved recleaning saw cylinder in connection with the single huller type of gin ribs, it will be obvious to those skilled in the art that the same could be used equally well in connection with the double huller type of gin ribs.

I claim:

1. In a cotton gin of the class described, in combination with the huller ribs and gin saws, a recleaning saw cylinder of smaller diameter than the gin saw cylinder mounted in the lower portion of the breast of the gin in a position to initially receive the seed cotton and in doffing relation to the gin saws and rotating in the same direction at a lower rate of speed, the teeth of the recleaning saws having a less lead than the teeth of the gin saws, one side of the breast of the gin defining the size of an opening past the recleaning saw cylinder on the side thereof remote from the gin saws for the free escape of hull particles and other trash.

2. In a cotton gin of the class described, in combination with the huller ribs and gin saws, a recleaning saw cylinder of smaller diameter than the gin saw cylinder mounted in the lower portion of the breast of the gin to rotate in the same direction as the gin saws at a lower rate of speed and positioned to have its saws at one side rotate in the spaces between the gin saws, the teeth of the recleaning saws having a less lead than the teeth of the gin saws, and one side of the breast defining the size of an opening past the recleaning saw cylinder on the side thereof remote from the gin saws, for the free escape of hull particles and other trash.

3. In a cotton gin of the class described, in combination with the huller ribs and gin saws, a recleaning saw cylinder of smaller diameter than the gin saw cylinder mounted in the lower portion of the breast of the gin in doffing relation to the gin saws and rotating in the same direction at a lower rate of speed, the teeth of the recleaning saws having a less lead than the teeth of the gin saws, and an inclined hull board located at the bottom of the breast and adapted to direct the seed cotton entering the huller breast into engagement with the side of the recleaning saw cylinder remote from the gin saws, whereby the recleaning saws will engage the cotton and carry the same into the path of the gin saws, the lower end of said hull board defining the size of an opening past the recleaning saws for the free escape of hull particles and other trash.

JOHN E. MITCHELL.